Nov. 28, 1933. H. J. DAHL 1,937,318
POP CORN MACHINE
Original Filed Feb. 18, 1929
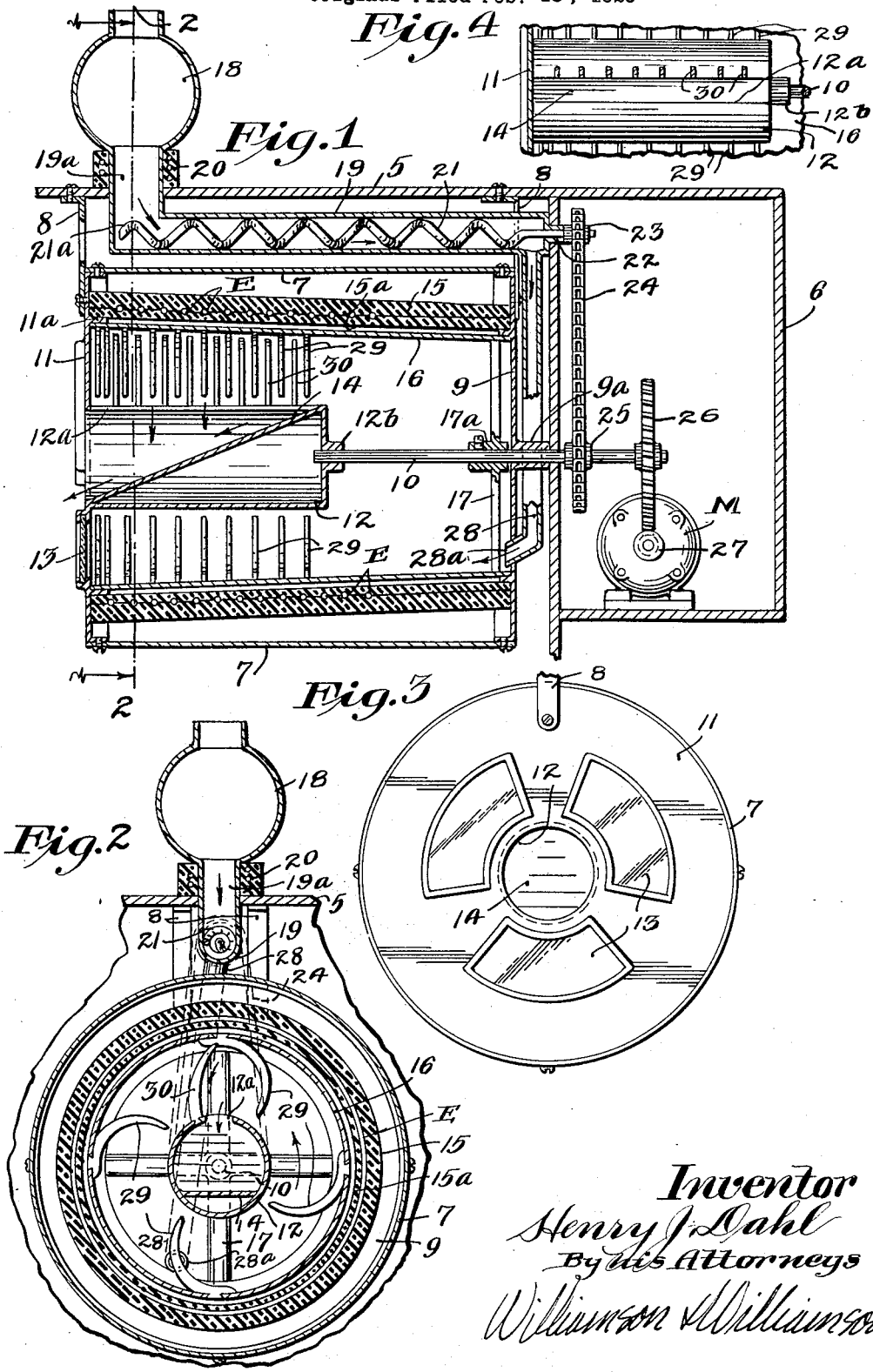
Inventor
Henry J. Dahl
By his Attorneys
Williamson & Williamson Patented Nov. 28, 1933

1,937,318

UNITED STATES PATENT OFFICE 1,937,318

POP CORN MACHINE

Henry Julian Dahl, Fargo, N. Dak., assignor of one-half to James M. Dahl, Borup, Minn., and Silas N. Dahl, Chicago, Ill.

Application February 18, 1929, Serial No. 340,870
Renewed December 12, 1932

6 Claims. (Cl. 53—4)

This invention relates to improvements in pop corn machines and particularly to commercial machines adapted for continuous operation and popping relatively large quantities of corn.

It is an object of my invention to provide a simplified and highly efficient pop corn machine adapted to be manufactured at a reduced cost having a greater capacity than most of the expensive machines extensively used at this time.

Another object is to provide a pop corn machine of the class described wherein a stream or supply of corn kernels is continuously and uniformly fed into the popping receptacle and wherein the supplied corn is preheated before entering the receptacle thereby accelerating the explosion or popping and producing a machine of high capacity.

Another object is to provide a pop corn machine of the class described wherein the popping is effected in an enclosed and insulated rotating receptacle provided with suitable heating elements and carrying conveyor arms or pegs which cooperate with stationary elements to remove continuously the popped corn from the machine and discharge the same conveniently for reception in bags or containers.

A more specific object is to provide in a machine of the class described a revolving popping receptacle disposed horizontally and supplied with corn from one end thereof in cooperation with an enclosed insulated casing surrounding the same and having wound therein an electrical heating element thereby facilitating adequate heating of the receptacle at relatively low cost.

These and other objects and advantages of the invention will be more fully set forth in the following description made in connection with the accompanying drawing, in which like reference characters refer to similar parts throughout the several views, and in which:—

Fig. 1 is a vertical section taken longitudinally of the entire machine;

Fig. 2 is a cross section taken on the line 2—2 of Fig. 1;

Fig. 3 is a fragmentary front elevation of the popping receptacle, and

Fig. 4 is a fragmentary top plan view of the discharge cylinder showing the stationary pegs or arms in cross section.

In the embodiment of my invention illustrated the machine proper is enclosed in a suitable cabinet which if desired may be constructed of transparent material and has a top 5 which extends far enough rearwardly of the machine proper to cover a box-like chamber 6 wherein a motor M is mounted for driving the working parts of my machine.

A horizontally disposed cylinder housing 7 is supported below the cabinet top 5 by suitable means such as angle brackets 8, said housing having a rear closure member 9 adjacent thereto, said closure carrying a central horizontal bearing 9a wherein the horizontal popping receptacle shaft 10 is journaled. The forward end of housing 7 is closed by means of a circular plate 11 having a substantially central aperture wherein is mounted a rearwardly and axially extending stationary discharge cylinder 12. Eccentrically and symmetrically arranged in forward closure plate 11 are a series of segmental shaped transparent sheets or panes 13 through which the popping of the corn may be observed. The discharge cylinder 12 is provided with an inclined chute 14 which extends from the forward and lower edge of the cylinder to the rearward and upper edge thereof, underlying an elongated slot 12a which extends longitudinally throughout the entire length of the cylinder and of suitable width to freely permit passage of popped corn therethrough from above.

Within housing 7 a substantially cylindrical and horizontally extending insulated casing 15 is mounted, as shown being secured to inwardly extending annular flanges provided by closure members 9 and 11. Insulated casing 15 is preferably constructed of some suitable insulating material, such as asbestos or porcelain and has a concentric lining 15a also preferably constructed of insulating material about which is wound a helical electrical heating element E. Casing 15 may taper slightly from its forward to its rearward end and a symmetrically shaped revoluble popping receptacle 16 is mounted therein comprising, preferably, an open-ended cylinder having attached within the rear end thereof a spider 17 provided with a hub 17a which is fixed to the shaft 10 just forwardly of shaft bearing 9a. The forward end of shaft 10 may be journaled in a suitable bearing 12b provided axially at the inner end of the discharge cylinder 12. The forward end of popping cylinder 16 may rotatively and internally engage annular flange 11a of the front closure member.

A hopper or preheating receptacle 18 is mounted above housing 7 preferably supported from the cabinet top 5 and communicates at its lower end with the elbow 19a of a feed tube 19 disposed substantially horizontally below the cabinet top. A suitable electrical heating element 20 surrounds the upper end of elbow 19a and is disposed below the bottom of hopper 18 and this heating element may be connected in multiple or series with heating element E and with a suitable source of electric current. Within tube 19 a helical or screw conveyor 21 is mounted and of suitable pitch to move the kernels of corn at the desired rate of speed for supply to the popping receptacles. The diameter of the conveyor may be slightly smaller than the tube in order that the forward end may be free and unsupported, and if a helical rod is utilized the forward end terminates in a projecting and agitating arm 21a which is adapted to loosen the grains of corn in the elbow 19a. Helical conveyor 21 terminates at its rear end in a straight rod journaled in a horizontal bearing 22 and carries adjacent to the extremity thereof, which projects within chamber 6, a sprocket 23. Sprocket 23 is connected for driving by means of an endless chain 24 with a driving sprocket 25 fixed to shaft 10. The rear extremity of shaft 10 may be provided with a worm gear 26 which is in mesh with a worm 27 fixed to the armature shaft of motor M.

A vertical supply conduit 28 communicates at its upper end with the rear end of tube 19 and has a forwardly extended lower extremity 28a which projects into the rear closure member 9 in communication with the popping receptacle through the apertured portions of spider 17.

The rotary popping cylinder 16 rigidly carries several series (as shown four) of spaced and horizontally aligned conveying pegs or arms 29 which are preferably curved and project inwardly for some distance clearing the periphery of discharge cylinder 12. The popping cylinder is revolved in the direction indicated by the arrow in Fig. 2 whereby it will be seen that the curved arms or pegs will engage, lift and convey the popped corn. A series of substantially vertical stripper pegs 30 are affixed to the top of discharge cylinder 12 adjacent the discharge slot 12a, positioned to cooperate with the conveying arms or pegs 29 to cause the popped corn to be delivered and dropped through the said discharge slot.

The operation, while probably obvious from the foregoing description may be briefly summarized as follows:

The hopper 18 is supplied with corn and the circuit through the heating elements E and 20 is closed and the electric motor is operated, revolving popping receptacle or cylinder 16 and also effecting the driving of the helical conveyor 21. The free end of said helical conveyor agitates the corn in hopper 18 and in the upper portion of elbow 19a, loosening the same and causing the corn in uniformly measured quantities to be delivered to the tube 19 where it is moved rearwardly and dropped through the conduit 28 into the rear end and bottom of the popping receptacle. The revolution of the receptacle distributes the supplied corn causing the same to be moved gradually in a forward direction and subjected to the effective heat within casing 15. The supplied corn is preheated by heating element 20 in the receptacle 18, (which is preferably constructed of heat conductive material) and also in its passage through elbow 19a; and pops very rapidly after introduction into the popping receptacle. The popped corn is picked up by the several series of conveying arms or pegs 29, while the unpopped kernels readily pass through said pegs until they reach the extreme forward end of the machine. If desired, two or more of the pegs of each set or series at the extreme forward end of the receptacle may be disposed in closely spaced relation to pick up accumulated unpopped kernels, although if desired other means may be provided for removing the same from the machine.

The stripper pegs 30 positioned adjacent the discharge slot 12a nicely cooperate with the conveying arms to cause the popped corn to be discharged through the slot onto the inclined chute 14 disposed therebelow in the discharge cylinder. The popped corn of course slides down this chute and can be conveniently collected in bags or containers from the forward end of closure member 11.

It will be seen that due to the continuous feeding of corn to the popping receptacle and the high efficiency of the heater casing 15 that the machine for its size and simplicity has a very high capacity. Its capacity is further increased by the preheating of the kernels of corn in the supply hopper 18 and elbow 19a.

From the foregoing description it is apparent that I have provided an extremely simple and highly efficient commercial pop corn machine capable of being manufactured at relatively low cost and continuously and automatically feeding and popping the corn.

It will, of course, be understood that various changes may be made in the form, details, proportions and arrangement of the parts, without departing from the scope of my invention, which, generally stated, consists in a device capable of carrying out the objects above set forth and in the novel parts and combinations of parts disclosed and defined in the appended claims.

I claim:

1. In a popcorn machine, a rotary popping cylinder mounted for rotation on a substantially horizontal axis, means for admitting unpopped corn into one end of said cylinder, a stationary discharge cylinder mounted concentrically within the opposite end of said popping cylinder and having an entrance at the upper portion thereof, a series of outwardly projecting spaced pegs fixed to said discharge cylinder adjacent said entrance and several circumferentially spaced series of inwardly projecting spaced pegs fixed to said popping cylinder and adapted to work between the pegs of said discharge cylinder during the rotation of said popping cylinder.

2. The structure set forth in claim 1, and an inclined chute in said discharge cylinder disposed below said entrance.

3. In a pop corn machine, a rotary popping cylinder mounted for rotation on a substantially horizontal axis, means for supplying corn to the interior of said cylinder, a discharge member mounted within said cylinder and spaced from the peripheral wall thereof and extending longitudinally of said cylinder, said member having a longitudinal aperture in the upper portion thereof, a series of outwardly projecting spaced pegs fixed to said member along one edge of said aperture and a series of spaced conveyor arms fixed to said cylinder and extending inwardly, said arms being adapted to work between said pegs during the rotation of said popping cylinder.

4. In a pop corn machine, a frame, a supply receptacle mounted at the top of said frame, a rotary substantially horizontal popping cylinder mounted in said frame below said supply receptacle, a discharge member mounted within said cylinder and spaced from the peripheral wall thereof and extending longitudinally of said cylinder, said member having a longitudinal opening in the upper portion thereof, a series of pop corn conveying elements mounted within said cylinder and spaced to prevent unpopped corn or kernels from being carried, a stationary closure at the end of said cylinder, a shaft secured to said cylinder and journaled in said stationary closure, a horizontal tube connected with said supply receptacle and disposed above said cylinder extending longitudinally thereof, a helical conveyor in said tube, means for connecting the outer end of said conveyor and said shaft for driving in unison, said closure having an aperture therein communicating with the interior of said popping cylinder and means for conveying the preheated corn from the outer end of said tube through said aperture into said popping cylinder.

5. In a pop corn machine, the combination with a rotary popping cylinder mounted for rotation on a substantially horizontal axis, means for admitting unpopped corn into one end of said cylinder, a stationary discharge cylinder mounted concentrically within the opposite end of said popping cylinder and having an entrance at the upper portion thereof, a series of outwardly projecting spaced pegs fixed to said discharge cylinder adjacent said entrance, several circumferentially spaced series of inwardly projecting spaced pegs fixed to said popping cylinder and adapted to work between the pegs of said discharge cylinder during the rotation of said popping cylinder, and a flat oval sheet of metal in the discharge cylinder disposed below said entrance, said sheet extending from the upper portion of one end and slanting to the lower portion of the opposite open end of said discharge cylinder and being adapted to direct the popped corn and the corn that does not pop received from the entrance above away from said entrance through the opening in front.

6. In a pop corn machine, the combination with a rotary popping cylinder mounted for rotation on a substantially horizontal axis, means for supplying corn to the interior of said cylinder, a discharge member mounted within said cylinder and spaced from the peripheral wall thereof and extending longitudinally of said cylinder, said member having a longitudinal aperture in the upper portion thereof, a series of outwardly projecting spaced pegs fixed to said member along one edge of said aperture, a series of spaced conveyor arms fixed to said cylinder and extending inwardly, said arms being adapted to work between said pegs during the rotation of said popping cylinder, and a flat elliptical sheet of metal in said discharge member disposed below said aperture, said sheet extending obliquely from the upper portion of one end and to the lower portion of the opposite open end of said discharge member and being adapted to direct the popped corn and the corn that does not pop received from the aperture above away from said aperture through a central opening.

HENRY JULIAN DAHL.